Patented Nov. 26, 1946

2,411,530

UNITED STATES PATENT OFFICE 2,411,530

PARASITICIDAL COMPOSITIONS

Robert R. Dreisbach and Fred W. Fletcher, Midland, Mich., assignors to The Dow Chemical Company, Midland, Mich., a corporation of Michigan No Drawing. Application January 1, 1942, Serial No. 425,334

6 Claims. (Cl. 167—24)

The present invention is concerned with novel parasiticidal compositions and is particularly directed to insecticidal products comprising certain alkylated naphthalenes as effective toxicants.

Naphthalene has been used as a fumigant, moth repellent and insecticidal toxicant. This compound is a crystalline solid melting at 80° C. and having a pungent and objectionable odor. Wearing apparel, food, and other materials of organic nature contacted with naphthalene or its vapors tenaciously retain the odor of the compound to an undesirable degree. By reason of the high vapor pressure and crystalline nature of naphthalene, it does not afford extended protection to surfaces upon which it is deposited but is soon dissipated by vaporizing or dusting. In addition, naphthalene is relatively nontoxic to many varieties of insect pests and high concentrations are required to control even those organisms against which it is presumed to be effective.

According to the present invention, it has been discovered that certain alkyl substituted naphthalenes are highly effective insecticidal toxicants and much more effective than is naphthalene itself when employed in combination with inert diluents and/or known parasiticides. The compounds employed in the compositions included within the scope of the invention have the following formula

wherein R represents ethyl or propyl, $x$ is an integer from 1–5, inclusive, and the sum of the carbon atoms in the alkyl substituents is at least 3.

The foregoing compounds are preferably employed as mixtures of isomers in which form they are for the most part water-white liquids, relatively insoluble in water, and soluble in many organic solvents. These products are relatively high boiling and have a low volatility and a faint perfume-like odor. They are relatively noninjurious to the foliage of plants in the amounts required for insect control, and can be used in combination with many known parasiticidal products and liquid or solid diluents without undergoing chemical change. In combination with such toxicants as rotenone, derris extract, phenols, etc., they also serve as solubilizers.

In carrying out the invention, the alkyl naphthalene product may be dissolved or otherwise dispersed in a noncorrosive organic solvent or water, or mixed with a finely divided solid diluent to form parasiticidal concentrates, sprays, dips, or dusts. If desired, wetting agents, dispersing agents, perfumes, and the like may be incorporated into the compositions.

Any suitable amounts of the alkylated naphthalenes may be employed in the new compositions, the exact proportions varying with the particular pest to be controlled, the physical nature of the ultimate composition desired, the presence or absence of supplementary toxicants in the composition, and the particular alkyl naphthalenes concerned. In the preparation of concentrates, from about 10 to 95 parts by weight of the alkyl naphthalene may be mixed with sufficient wetting or dispersing agents to form 100 parts of a product adapted to be diluted to form either spray or dust compositions. Dilute spray compositions whether in the form of solutions, emulsions, or suspensions may contain from 0.001 per cent to approximately 20 per cent by weight of the alkyl naphthalene. Dust compositions preferably run from 1 to 10 per cent by weight of toxicant if they are to be applied directly for insect control. Where the dust is to be subsequently dispersed in a liquid carrier or modified with further finely divided solid carrier, as much as 90 per cent of active toxicant may be employed.

Among the wetting and dispersing agents which are compatible in the compositions of the present invention are bentonite, blood albumen, soaps, metal naphthenates, metal caseinates, long chain aliphatic acids and alcohols and their salts and esters, aryloxy alcohols, certain phenols, sulfonated alcohols and phenols and their salts, sulfonated aromatic hydrocarbons, etc. Preferred insecticidal and fungicidal toxicants adapted to be incorporated in alkyl naphthalene containing compositions include derris, pyrethrin, hydroxy-alkyl ethers of phenols, and chloro-alkoxy-alkyl ethers of phenols. Other toxicants which may be similarly employed are nicotine sulfate, organic thiocyanates, polychlorophenols, nitrophenols, complex amine structures, sulfur, cryolite, lime sulfur, lead arsenate, copper sprays and dusts, etc. Similarly, pine oil, high boiling white petroleum oil, light lubricating oil, peanut oil, soya bean oil, castor oil, and cod-liver oil may serve as supplemental parasiticides or carriers for the alkyl naphthalene toxicants.

In the preparation of solutions or dispersions of the alkyl naphthalenes, water, ethanol, methanol, propanol, butanol, acetone, methyl ethyl ketone, benzene, chlorobenzene, toluene, xylene, ethylene chloride, carbon tetrachloride, kerosene and the like, or mixtures of two or more of such liquids may be employed as carriers. Suitable finely divided diluents for preparation of dusts and dust concentrates include wood flour, volcanic ash, pyrophyllite, bentonite, diatomaceous earth, calcium carbonate, lime, calcium sulfate, gypsum, tricalcium phosphate, carbon etc.

The alkyl naphthalenes employed as insecticidal toxicants in the compositions with which the present invention is concerned may be prepared by the direct alkylation of naphthalene. The exact method employed is dependent upon whether an ethylated or propylated naphthalene product is desired. To obtain the ethylated derivatives, it has been found convenient to react diethylbenzene with naphthalene in the presence of a small amount of a Friedel-Crafts catalyst such as aluminum chloride, zinc chloride, iron chloride, etc. While any suitable proportions of the reactants may be employed, an appreciable molecular excess of diethylbenzene in the reaction mixture has been found desirable. By operating in this manner, a high proportion of the naphthalene is alkylated and the excess diethylbenzene present in the mixture serves with the benzene and monoethylbenzene formed in the reaction, as a reaction solvent. The reaction may be carried out by dispersing the naphthalene in the diethyl benzene and thereafter adding the Friedel-Crafts catalyst portionwise to the mixture. The temperature is preferably maintained at between about 120° and 180° C., although somewhat higher or lower temperatures may be employed. After all of the catalyst had been added, the reaction mixture is heated and stirred for a period of time dependent upon the nature of the product desired. When a preponderance of the lower alkylated derivatives is desired, the reaction time may be very short. To obtain a preponderance of the higher boiling polyalkylated derivatives, heating may be continued for a period of several hours. Following completion of the reaction, the mixture is washed with water and thereafter distilled. Unreacted naphthalene and diethyl benzene and benzene and ethyl benzene formed during the reaction may conveniently be separated by distillation at atmospheric pressure. The ethyl naphthalene-containing residue from the distillation at atmospheric pressure is then fractionated under reduced pressure.

The following description of the preparation of ethylated naphthalenes is not to be construed as limiting:

240 pounds of naphthalene and 180 pounds of diethylbenzene were warmed and mixed together. 8 pounds of anhydrous aluminum chloride was added portionwise to this mixture with stirring over a short period of time and at a temperature of above 160° C. The mixture was thereafter stirred and heated at 160° to 170° C. for ½ hour, cooled to room temperature, and washed with water to remove residual aluminum chloride catalyst. The washed product was distilled at atmospheric pressure to recover 79 pounds of naphthalene, 57 pounds of unreacted diethyl benzene, and 74 pounds of a mixture of benzene and monoethylbenzene. The residue from this stripping distillation was fractionally distilled to separate all products boiling at between 140° and 230° C. at 25 mm. pressure. This range was found to include the di, tri, tetra, and pentaethyl naphthalenes. The following table sets forth the physical properties of the various fractions and combinations of fractions obtained.

*Ethylated naphthalenes*

| Fraction No. | Boiling temperature at 25 mm. pressure | Boiling temperature corrected to atmospheric pressure | Probable constitution |
|---|---|---|---|
| | °C. | °C. | |
| 1 | 170–177.5 | 294–302 | 90% diethyl, 10% triethyl. |
| 2 | 175.5–181 | 299–305 | Mostly diethyl. |
| 3 | 191–200 | 316–326 | 25% diethyl, 75% triethyl. |
| 4 | 200–208 | 326–334 | 85% triethyl, 15% tetraethyl. |
| 5 | 208–219 | 334–347 | 35% triethyl, 65% tetraethyl. |
| 6 | 219–231 | 347–362 | 85% tetraethyl, 15% pentaethyl. |
| 7 | 203–218 | 329–346 | 50% triethyl, 50% tetraethyl. |
| 8 | 160–178 | 283–302 | 10% monoethyl, 90% diethyl. |
| 9 | 180–232 | 304–362 | Mixture of di, tri, tetra, and pentaethyl. |
| 10 | 166–171 | 290–295 | Diethyl. |
| 11 | ¹200 | 325 | Mostly triethyl. |
| 12 | ¹220 | 350 | Mostly tetraethyl. |
| 13 | ¹230 | 360 | Mostly pentaethyl. |

¹ Approximately.

The method as set forth above for the preparation of ethylated naphthalenes may also be employed for the preparation of the propyl homologues by the substitution of dipropylbenzene for diethylbenzene. An alternate and preferred procedure comprises reacting propylene with naphthalene in the presence of a Friedel-Crafts catalyst and preferably in the presence of an inert solvent, e. g., carbon bisulfide or nitro benzene. In carrying out this reaction the naphthalene, catalyst, and reaction solvent are mixed together and any desired amount of propylene passed into the mixture with agitation and at a relatively low temperature, e. g., between about −5° and 10° C. The amount of propylene employed and the temperature of reaction determines to a considerable degree the nature of the propylated naphthalenes obtained. The following preparation is illustrative:

256 grams of naphthalene and 26 grams of anhydrous aluminum chloride were dispersed in 387 grams of carbon bisulfide previously cooled to approximately 0° C. 63 grams of propylene was passed into this mixture with stirring over a period of 1.25 hours, and at temperatures ranging between 0° and 10° C. Agitation was continued as the crude reaction mixture was slowly warmed to room temperature. The mixture was then washed with water and distilled at atmospheric pressure to recover unreacted naphthalenes and carbon bisulfide. The residue from the initial distillation was fractionated under reduced pressure to recover various fractions consisting, for the most part, of mixtures of isomeric isopropylated naphthalenes. The following table sets forth the characteristics of these products:

*Propylated naphthalenes*

| Fraction No. | Boiling temperature at 25 mm. pressure | Boiling temperature corrected to atmospheric pressure | Probable constitution |
|---|---|---|---|
| | °C. | °C. | |
| 14 | 140–164 | 257–287 | 75% monopropyl, 25% dipropyl. |
| 15 | 156–168 | 278–292 | 50% monopropyl, 50% dipropyl. |
| 16 | 164–180 | 287–304 | 10% monopropyl, 90% dipropyl. |
| 17 | ¹176–198 | 300–324 | 40% dipropyl, 60% tripropyl. |
| 18 | 192–207 | 318–333 | 10% dipropyl, 90% tripropyl. |
| 19 | 140–262 | 257–394 | Mixture of mono, di, tri, tetra, and pentapropyl. |
| 20 | 187–190.5 | 313–316 | 60% dipropyl, 40% tripropyl. |
| 21 | 150 | 269 | Monopropyl. |
| 22 | 181 | 305 | Dipropyl. |
| 23 | ²208 | 335 | Mostly tripropyl. |
| 24 | ²230 | 360 | Mostly tetrapropyl. |
| 25 | ²260 | 390 | Mostly pentapropyl. |

¹ Mostly at 190.5°–195.5° C.
² Approximately.

The following examples illustrate the invention:

*Example 1*

70 parts by weight of ethylated naphthalene fraction No. 1, 20 parts by weight of white paraffin oil, and 10 parts by weight of a wetting and dispersing agent, consisting of a condensation product of ethylene oxide and an organic acid and sold as Emulphor EL, were mixed together to form a concentrate. Sufficient of this product was dispersed in water to give a concentration of 2 pounds of the ethylated naphthalene fraction per 100 gallons of ultimate spray composition. This spray was applied for the control of red spider on bean foliage and was found to kill 80 per cent of the spider adult and young.

*Example 2*

71 parts by weight of ethylated naphthalene fraction No. 2, 20 parts of pine oil, 4 parts of Emulphor EL, and 5 parts of a partially neutralized sulfonated oil marketed as NOPCO 1216 were mixed together to form a concentrate which in aqueous dispersion gave a kill against red spider of 76 per cent. The concentration of ethylated naphthalene fraction in the spray as applied amounted to 1.0 pound per 100 gallons.

*Example 3*

Ethylated naphthalene fraction No. 3 was compounded substantially as set forth in Example 1, and the resulting concentrate dispersed in water to give a spray composition comprising 2.0 pounds of toxicant per 100 gallons. This composition gave a kill against red spider on bean foliage of 80 per cent.

50 parts by weight of the fraction No. 3 was mixed with 50 parts by weight of sodium lauryl sulfate and the resulting composition dispersed in water to obtain a spray material comprising 1.0 pound of the toxicant per 100 gallons. This spray was applied for the control of poplar aphid and found to give a kill of 99 per cent.

*Example 4*

Ethylated naphthalene fraction No. 4 was compounded substantially as described in Example 2 to obtain a product which in dispersion with water gave a kill against red spider of 90.5 per cent at a toxicant concentration of 1.0 pound per 100 gallons.

*Example 5*

Ethylated naphthalene fraction No. 5 was compounded with pine oil and wetting and emulsifying agents substantially as described in Example 2. When this product was dispersed in water to give a toxicant concentration of 1 pound per 100 gallons, a spray material was obtained which gave a kill against *Aphis rumicis* of 97 per cent. At 2 pounds of toxicant per 100 gallons, the aqueous dispersion gave a kill against red spider of 100 per cent.

*Example 6*

80 parts by weight of ethylated naphthalene fraction No. 6 was mixed with 20 parts by weight of sodium lauryl sulfate. The resulting product was dispersed in sufficient water to give a concentration of 2 pounds of toxicant per 100 gallons of spray material. When applied against red spider this spray gave a kill of 100 per cent. In a modification of this formula equal parts by weight of the ethylated naphthalene and sodium lauryl sulfate were compounded to form a concentrate which at 1 pound of toxicant per 100 gallons of aqueous spray killed 94 per cent of *Aphis rumicis*.

60 parts by weight of the fraction No. 6, 20 parts by weight of a white paraffin oil, 10 parts of NOPCO 1216, and 10 parts of Emulphor EL, were mixed together to obtain a liquid product adapted to be employed as a concentrate in the preparation of agricultural spray mixtures. In aqueous dispersion at a concentration of 2 pounds of the ethylated naphthalene fraction per 100 gallons, the product gave a kill against lily aphid of 98 per cent.

19.5 parts by weight of the fraction No. 6, 78.1 parts of diatomaceous earth, and 2.4 parts of sodium lauryl sulfate were ground together to form a dust mixture adapted to be employed in the preparation of aqueous sprays. When dispersed in sufficient water to give a toxicant concentration of 2 pounds per 100 gallons, this mixture gave a kill of 100 per cent against poplar aphid.

5 parts of the ethylated naphthalene fraction No. 6 was dispersed on a mixture of 25 parts of diatomaceous earth and 70 parts of pyrophyllite to obtain a dust product adapted to be applied without further modification for the control of plant parasites. In a field test against pea aphid, this composition gave a control of 79 per cent.

A similar composition consisting of a mixture of 2.5 parts of the fraction No. 6, 1 part of ground derris root containing 5 per cent of rotenone, and 96.5 per cent of pyrophyllite gave a kill of 94.2 per cent against pea aphid.

8.33 grams of ethylated naphthalene fraction No. 6 was dissolved in 100 milliliters of kerosene and employed as a spray for the control of 5 day-old house flies according to the Peet-Grady procedure. This composition gave a knockdown of 70 per cent in 10 minutes and a kill of 46 per cent in 24 hours.

*Example 7*

Equal parts by weight of ethylated naphthalene fraction No. 7 and sodium lauryl sulfate were mixed together to obtain a product which dispersed readily in water. An aqueous dispersion comprising sufficient of this concentrate to provide 1 pound of toxicant per 100 gallons of spray gave a kill against poplar aphid of 100 per cent.

*Example 8*

In a similar determination an aqueous spray composition comprising a concentrate composed of 80 parts by weight of the ethylated naphthalene fraction No. 8 and 20 parts of sodium lauryl sulfate gave a kill against poplar aphid of 99 per cent. The toxicant concentration in the diluted spray material was 2 pounds per 100 gallons.

*Example 9*

A dilute spray composition prepared substantially as described in Example 8 and comprising as a toxic ingredient the ethylated naphthalene fraction No. 9 gave a kill against poplar aphid of 100 per cent. In a modification of this composition equal parts by weight of the ethylated naphthalene fraction and sodium lauryl sulfate were mixed together and the mixture thereafter diluted with water to give a spray material comprising 1 pound of toxicant per 100 gallons. This spray composition gave a kill against *Aphis rumicis* of 91.7 per cent.

4.21 grams of the ethylated naphthalene fraction No. 9 was dissolved in 100 milliliters of kerosene to give a spray material which was employed for the control of house flies in accordance with the Peet-Grady procedure. This composition gave a knockdown of 99 per cent in 10 minutes and a kill of 31.3 per cent in 24 hours. A control solution containing 50 milligrams of pyrethrin dissolved in 100 milliliters of kerosene gave a knockdown of 99 per cent in 10 minutes and a kill of 20 per cent in 24 hours. When 4.21 grams of the ethylated naphthalene fraction No. 9 was dissolved in 100 milliliters of the pyrethrin solution, a spray composition was obtained which gave a knockdown of 99 per cent in 10 minutes and a kill of 65.3 per cent in 24 hours.

*Example 10*

70 parts by weight of ethylated naphthalene fraction No. 10 (consisting essentially of diethylnaphthalene), 10 parts of beta-(4-tertiarybutyl-phenoxy)-ethanol, and 20 parts of NOPCO 1216 were mixed together to form a concentrate. This product was dispersed in water in amount sufficient to give a concentration of 3.0 pounds of the ethylated naphthalene per 100 gallons of spray material. Against cabbage aphid this spray gave a kill of 90 per cent.

4.21 grams of the fraction No. 10 was dissolved in 100 milliliters of kerosene. When tested according to the Peet-Grady method this spray gave a knockdown of 6.2 per cent in 10 minutes and a kill of 25.7 per cent in 24 hours. A synthetic fly toxicant identified as beta-chloro-beta'-(2.4.5.6-tetrachlorophenoxy)-diethyl ether in the amount of 1.22 grams per 100 milliliters of kerosene gave a knockdown of 56.6 per cent in 10 minutes and a kill of 8.3 per cent in 24 hours. The addition of 4.21 grams of ethylated naphthalene fraction No. 10 to the solution of diethyl ether compound gave a product which knocked down 68.5 per cent of the house flies in 10 minutes and killed 43.6 per cent in 24 hours. The combination of 4.21 grams of fraction No. 10 with the pyrethrin control solution described in Example 9 gave a spray which knocked down 100 per cent in 10 minutes and killed 59.4 per cent in 24 hours, when applied in accordance with the Peet-Grady procedure.

*Example 11*

80 parts by weight of propylated naphthalene fraction No. 14, and 20 parts by weight of sodium lauryl sulfate were mixed together. 2.5 pounds of this mixture was dispersed in 100 gallons of water and the resulting fine dispersion of toxicant applied for the control of poplar aphid. A kill of 95 per cent was obtained.

*Example 12*

19.5 parts by weight of propylated naphthalene fraction No. 15, 78.1 parts of diatomaceous earth, and 2.4 parts of sodium lauryl sulfate were mixed together to form a dust concentrate. This composition was dispersed in water in such proportion that 100 gallons of the resultant spray contained 2 pounds of the propylated naphthalene toxicant. Against red spider, this composition gave a kill of 83 per cent.

70 parts by weight of fraction No. 15, 10 parts of beta-(4-tertiarybutyl-phenoxy)-ethanol, 10 parts of NOPCO 1216, and 10 parts of Emulphor EL were mixed together to form a liquid parasiticidal concentrate. 3 pounds of this composition was dispersed in 100 gallons of water to obtain a spray material which gave a control of 96.8 per cent against cabbage aphid.

80 parts by weight of fraction No. 15, 10 parts by weight of NOPCO 1216, and 10 parts by weight of Emulphor EL were compounded together and dispersed in sufficient water to give a concentration of 2 pounds of the toxicant per 100 gallons. Against pea aphid, this spray material gave a control of 93.9 per cent.

5 parts by weight of fraction No. 15, 25 parts of diatomaceous earth, and 70 parts of pyrophyllite were ground together to produce a dust composition which was applied directly to pea vines for the control of pea aphid. This product gave a control of 79 per cent.

In a similar fashion 2 pounds of fraction No. 15 and 2 pounds of a ground derris root product comprising 5 per cent by weight of rotenone were mixed with 96 parts of pyrophyllite. This composition, when applied with conventional dusting apparatus, gave a control against pea aphid of 94 per cent.

8.88 grams of the propylated naphthalene fraction No. 15 was dissolved in 100 milliliters of kerosene and applied for the control of house flies according to the Peet-Grady procedure. The composition gave a knockdown of 88 per cent in 10 minutes and a kill of 33.9 per cent in 24 hours. 8.88 grams of fraction No. 15 dissolved in the pyrethrin solution described in Example 9 formed a composition which gave a knockdown of 100 per cent in 10 minutes and a kill of 57.3 per cent in 24 hours.

*Example 13*

80 parts by weight of propylated naphthalene fraction No. 16 and 20 parts of sodium lauryl sulfate were mixed together and diluted with sufficient water to give a concentration of 2 pounds of toxicant per 100 gallons. This spray material killed 95 per cent of poplar aphid.

*Example 14*

A composition in which propylated naphthalene fraction No. 17 was substituted for No. 16 of the previous example gave a kill against poplar aphid of 98 per cent. Against *Aphis rumicis* an aqueous dispersion comprising 1 pound of the toxicant per 100 gallons gave a kill of 77.1 per cent.

71 parts by weight of the fraction No. 17, 20 parts of pine oil, 4 parts of Emulphor EL, and 5 parts of NOPCO 1216 were mixed together to give an oily concentrate. Sufficient of this product was dispersed in water to give a toxicant concentration of 1 pound per 100 gallons. Against *Aphis rumicis* this spray gave a kill of 88 per cent.

8.3 grams of propylated naphthalene fraction No. 17 was dissolved in 100 milliliters of kerosene. This composition gave a knockdown of 78.3 per cent in 10 minutes and a kill of 36.2 per cent in 24 hours against house flies. A solution of 2.5 grams of beta-chloro-beta'-(2.3.4.6-tetra-chlorophenoxy)-diethyl ether in 100 milliliters of kerosene gave a knockdown of 68.8 per cent in 10 minutes and a kill of 42.9 per cent in 24 hours. A solution of 8.3 grams of fraction No. 17 and 2.5 grams of the diethyl ether compound in 100 milliliters of kerosene gave a knockdown of 98.6 per cent in 10 minutes and a kill of 89.1 per cent against house flies.

*Example 15*

4.21 grams of propylated naphthalene fraction No. 18 was dissolved in 100 milliliters of kerosene and tested according to the standard Peet-Grady procedure. This material gave a knockdown of 85.9 per cent of the flies in 10 minutes and a kill of 25.9 per cent in 24 hours. When the pyrethrin control solution of Example 9 was modified with 4.21 grams of this fraction, the resulting spray gave a knockdown of 100 per cent in 10 minutes and a kill of 53.5 in 24 hours. A solution of 1.22 grams of beta-chloro-beta'-(2.3.4.6-tetra-chlorophenoxy)-diethyl ether in 100 milliliters of kerosene gave a knockdown of 56.5 per cent in 10 minutes and a kill of 8.3 per cent in 24 hours. When modified by the addition of 4.21 grams of fraction No. 18, the latter composition knocked down 91.9 per cent in 10 minutes and gave a kill of 48.3 per cent in 24 hours.

A mixture of 80 parts by weight of fraction No. 18 and 20 parts by weight of sodium lauryl sulfate was used at 2.5 pounds per 100 gallons of water to form an aqueous spray. This product gave a 99 per cent kill of poplar aphid.

Example 16

A mixture of 80 parts by weight of propylated naphlene fraction No. 19 and 20 parts by weight of sodium lauryl sulfate at a concentration of 2.5 pounds per 100 gallons of water gave a kill against poplar aphid of 98 per cent.

Example 17

71 parts by weight of propylated naphthalene fraction No. 20, 20 parts of pine oil, 4 parts of Emulphor EL, and 5 parts of NOPCO 1216 were mixed together to give an oily concentrate. Sufficient of this composition was dispersed in water to give a toxicant concentration of 1.0 pound per 100 gallons. This spray composition killed 78 per cent of Aphis rumicis.

Example 18

A similar composition in which propylated naphthalene fraction No. 22 was employed gave a kill of 78 per cent against Aphis rumicis.

Example 19

8.88 parts by weight of propylated naphthalene fraction No. 25 was dissolved in 100 milliliters of kerosene. This spray composition gave a knockdown of 33.8 per cent in 10 minutes and a kill of 11.4 per cent in 24 hours against house flies when tested in accordance with the Peet-Grady procedure. When modified by the inclusion of 50 milligrams of pyrethrin per 100 milliliters, the composition knocked down 99.2 per cent of the flies in 10 minutes and killed 48.2 per cent in 24 hours.

We claim:

1. An insecticidal composition comprising as active ingredients pyrethrins and an alkylated naphthalene having the formula:

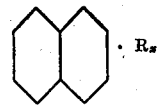

wherein R is selected from the group consisting of ethyl and propyl radicals, $x$ is an integer from 1 to 5, inclusive, and the sum of the carbon atoms in the alkyl substituents is at least 3.

2. An insecticidal composition comprising as active ingredients rotenone and an alkylated naphthalene having the formula

wherein R is selected from the group consisting of ethyl and propyl radicals, $x$ is an integer from 1 to 5, inclusive, and the sum of the carbon atoms in the alkyl substituents is at least 3.

3. An insecticidal composition comprising as an active toxicant an alkylated naphthalene having the formula

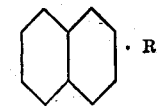

wherein R is selected from the group consisting of ethyl and propyl radicals, $x$ is an integer from 1 to 5, inclusive, and the sum of the carbon atoms in the alkyl substituents is at least 3, and a carrier therefor.

4. An insecticidal composition comprising as an active toxicant a polyethylnaphthalene, and a carrier therefor.

5. An insecticidal composition comprising as an active toxicant a propylnaphthalene, and a carrier therefor.

6. An insecticidal composition comprising as active ingredients (1) an alkylated naphthalene having the formula

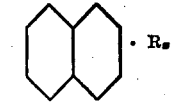

wherein R is selected from the group consisting of ethyl and propyl radicals, $x$ is an integer from 1 to 5, inclusive, and the sum of the carbon atoms in the alkyl substituents is at least 3, and (2) a member of the class of plant toxicants consisting of pyrethrins and rotenone.

ROBERT R. DREISBACH.
FRED W. FLETCHER.